United States Patent [19]

Murphy

[11] Patent Number: 5,297,291
[45] Date of Patent: Mar. 22, 1994

[54] SYSTEM FOR LINKING PROGRAM UNITS BY BINDING SYMBOL VECTOR INDEX IN THE SYMBOL TABLE INTO CALLING IMAGE TO OBTAIN CURRENT VALUE OF THE TARGET IMAGE

[75] Inventor: Daniel L. Murphy, Hollis, N.H.

[73] Assignee: Digital Equipment Corporation, Maynard, Mass.

[21] Appl. No.: 666,023

[22] Filed: Mar. 7, 1991

[51] Int. Cl.$^5$ .......................... G06F 3/00; G06F 13/00
[52] U.S. Cl. .................................. 395/700; 364/280.4; 364/255.7; 364/DIG. 1
[58] Field of Search ................. 395/800, 700, 500, 425

[56] References Cited

U.S. PATENT DOCUMENTS

| | | | |
|---|---|---|---|
| 4,309,756 | 1/1982 | Beckler | 395/700 |
| 4,553,205 | 11/1985 | Porchia | 395/375 |
| 4,636,940 | 1/1987 | Goodwin, Jr. | 395/700 |
| 4,792,895 | 12/1988 | Tallman | 395/375 |
| 4,961,133 | 10/1990 | Talati et al. | 395/700 |
| 5,062,039 | 10/1991 | Brown et al. | 364/200 |
| 5,067,072 | 11/1991 | Talati et al. | 395/650 |
| 5,093,916 | 3/1992 | Karp et al. | 395/700 |
| 5,097,533 | 3/1992 | Burger et al. | 395/500 |
| 5,201,048 | 4/1993 | Coulter et al. | 395/600 |
| 5,212,633 | 5/1993 | Franzmeier | 395/500 |
| 5,253,361 | 10/1993 | Thurman et al. | 395/600 |

FOREIGN PATENT DOCUMENTS 0336552 10/1989 European Pat. Off. .

OTHER PUBLICATIONS

MacArthur, "Shareable Image Libraries: A Tool for Enhanced Structured Project Development at the User Level", VAX Professional, Feb. 1989, pp. 27-33.
Naecker, "Software Layering Part 3–Building a Shareable Image", VAX Professinal, vol. 11, No. 3, Jun. 1989, pp. 23-29.
IBM Technical Disclosure Bulletin, "Dynamic Loading Using an Extended Router Linkage Mechanism", vol. 30, No. 9, Feb. 1988, p. 373.

Primary Examiner—Alyssa H. Bowler
Assistant Examiner—Meng-Ai T. An
Attorney, Agent, or Firm—Albert P. Cefalo; Barry N. Young

[57] ABSTRACT

An improved method for linking images at program activation is provided by use of a symbol vector in a sharable code image. The symbol vector is automatically constructed which the linker and operating system use to effect fast lookup of symbol values at program activation, thus providing flexibility similar to that of link-time binding. For each sharable image being constructed, the programmer provides a list of symbols which are to be made visible outside of the image. These symbols may be procedure names, data cells, absolute values, or any other valid use of a symbolic value. The order of this list must remain fixed from one image build to the next. From this list, the "symbol vector" is constructed (as by the linker) of the value of each of the identified symbols, and the symbol vector is associated with the sharable image. A symbol table is also associated with the sharable image, where each symbol has the value of its index in the symbol vector. When resolving references to other images, the linker does a symbolic lookup in the symbol table of the target image and obtains the index into the target symbol vector. That index is bound into the calling image. Then, at program activation, the image activator uses the index bound into a calling image to obtain the current value of the symbol in the target image.

18 Claims, 5 Drawing Sheets

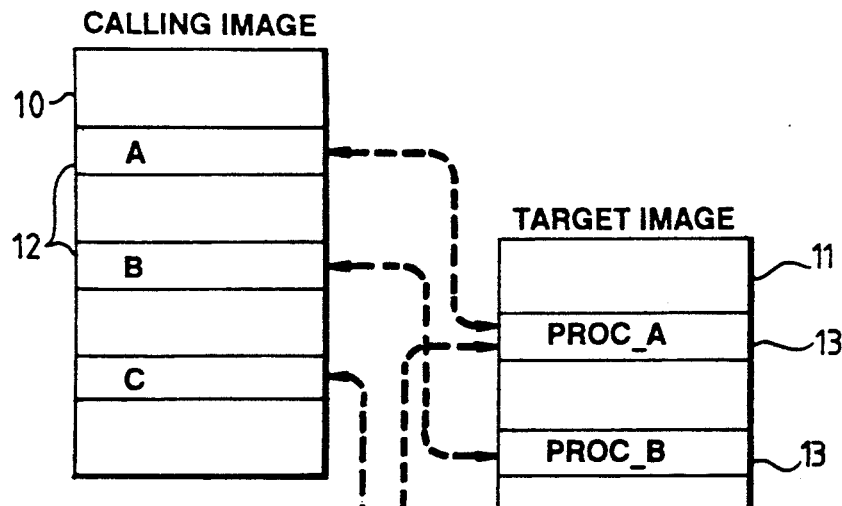
FIG. 2
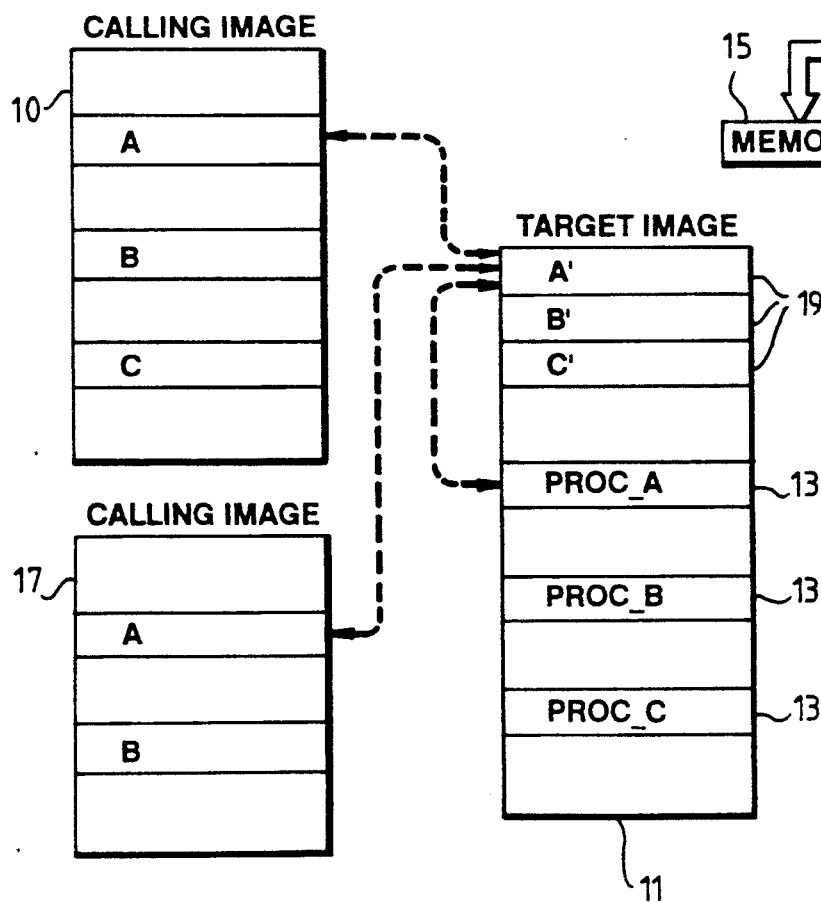
FIG. 1
FIG. 3
PRIOR ART

SYSTEM FOR LINKING PROGRAM UNITS BY BINDING SYMBOL VECTOR INDEX IN THE SYMBOL TABLE INTO CALLING IMAGE TO OBTAIN CURRENT VALUE OF THE TARGET IMAGE

BACKGROUND OF THE INVENTION

This invention relates to computer programming, and more particularly to a method of making callable symbols visible outside a code image in an environment supporting sharable images.

When a computer program is compiled to produce an object code module, there are symbols within this module that should be visible outside the module, as in procedure calls or the like. Usually, a number of these modules are linked together to produce an executable image, and at the time of linking the relative locations of the callable symbols are identified. When the combined image is activated (at run time) on a central processing unit (CPU), the symbols are assigned memory addresses, so calls are made to specific addresses. Most operating systems used on computers create a single, combined executable image at run time, so these assigned memory locations bear a fixed relationship to other parts of program.

A feature of the VAX/VMS TM operating system, however, is the support of sharable object code images. An applications program may make use of library images, e.g., for printing, video display, etc., that are used by many other programs. Rather than use a copy of each of such library images for each applications program, there is provided the capability of sharing such images by a number of programs activated at the same time in a multi-user and/or multi-tasking environment. Thus, when several programs make use of a library image, only one copy of this image need be activated, instead of a copy for each program using it. In this manner, real memory space is conserved. More importantly, in a hierarchical memory it is more likely that the shared image will stay in higher-speed memory rather and be accessible when needed, so overall performance (speed of execution) is improved. That is, it is more likely that the code image needed will be in cache, or in real memory instead of swapped out to disk in a virtual memory system, when it is needed.

Using this sharable image feature of the VMS operating system, large program units ("images") may be constructed from a set of compiled modules, and may invoke service in other such images and in the operating system itself. Hence, images serve as super modular program units which may be supplied by different vendors and which, with certain limitations, do not need to be rebuilt if others around them change. A main program block may use images in memory for specific purposes (e.g., math processing, windowing, etc.) used by other tasks executing on the same CPU, in a multi-user, multitasking environment. In this manner, these auxiliary program functions need not be duplicated in memory, thus conserving memory space, and time is saved upon image activation.

While the feature of sharable code images has been a valuable part of the VAX/VMS operating system, the advance of computer architectures has made it necessary to provide improved or expanded capabilities for programs taking advantage of these advanced architectures. For example, data path widths have expanded from 8-bit, to 16-bit, to 32-bit, and now to 64-bit. Memory has become vastly cheaper and faster. Semiconductor VLSI technologies have allowed more and more of the component parts of a computer to be integrated, with resultant improvements in speed, cost, power dissipation and size. Advances in compiler theories have made it advantageous to expose more of the elemental steps of execution of functions to the programmer or compiler rather than embedding them in microcode. These and other factors have resulted in a trend toward so-called Reduced Instruction Set Computer (RISC) architectures rather than the Complex Instruction Set Computer (CISC) architecture of the VAX machine. In particular, an advanced 64-bit RISC architecture taking advantage of all of these technology improvements has been developed as set forth in pending U.S. patent application Ser. No. 547,619, filed Jun. 29, 1990, now abandoned, assigned to Digital Equipment Corporation, providing a high-performance vehicle for which programs written in VAX code may be transformed. In order for applications programs written for the VAX architecture and the VMS operation system to be directly transformed, many features of VAX/VMS should be supported in the operating system for the advanced RISC architecture. Among these is the concept of sharable images.

Since the advanced RISC architecture has a different instruction set and different linkage mechanisms, provision must be made for translating code from VAX/VMS so that the feature can still be implemented. Additionally, the sharable image feature in VMS had limitations with regard to independence of images, and by relaxing these limitations the implementation in the advanced RISC environment is made more flexible and less constrained.

Previously, the VAX/VMS operating system supported sharable images by employing a transfer vector in the target image. This transfer vector was a data structure having an entry for each procedure within the code image that was to be visible externally. Each entry contained the offset to one of the procedures, and the entries were in a fixed order. The calling image need only have the address of the transfer vector and the order number of the called procedure within the transfer vector. So, at image execution time, the called procedure is referenced by merely referencing the transfer vector (or, more precisely, an offset in the vector according to which ordered number this called procedure was placed) where a pointer to the actual address is found. The actual location of the procedures Proc__A, Proc__B, etc., in the image 11 could vary, with updates or corrections to the code, for example. As discussed above, however, this method has certain shortcomings in the present environment.

Thus, VAX/VMS by the sharable image feature provides a limited kind of linking between images at program startup. This linkage requires that programmers manually construct a "transfer vector" within each image to be shared, where each entry represents the transfer point for a procedure within that image or possibly a data cell or structure. By constructing this vector (a typical practice at many interfaces of an operating or programming system), the relative value (offset) of each entry is made invariant and may be bound into other images which call this one, so long as the location of the transfer vector is known at activation time.

There are several disadvantages in the use of transfer vectors in the sharable image feature, however. First, additional execution overhead is imposed upon each call to a shared image because of having to pass control through the transfer vector and then to the actual target routine. This overhead consists of executing added instructions and making additional memory references. Secondly, additional programming effort is needed to specify and maintain the transfer vector. Third, execution errors occur if the vector is inadvertently changed. Fourth, there is a lack of flexibility in referencing data cells and structures (as distinguished from executable procedures), since they must be located within the transfer vector itself, or else incur additional execution overhead and programming effort. Fifth, special language semantics may be required for the specification of transfer vectors which may not be available in the programmer's language of choice.

SUMMARY OF THE INVENTION

In accordance with one embodiment of the invention, there is provided an improved method for linking images at program activation, addressing the limitations of the prior method as discussed above. The improved method uses the feature of automatically constructing a "symbol vector" which the linker and operating system use to effect fast lookup of symbols values at program activation, thus providing flexibility similar to that of link time binding.

According to the method of the invention, for each sharable image being constructed, the programmer provides a list of symbols which are to be made visible outside of the image. (This is comparable to declaring symbols in a compilation unit that are to be made visible outside of that unit.) These symbols may be procedure names, data cells, absolute values, or any other valid use of a symbolic value. The only requirement is that the order of this list remain fixed from one image build to the next. From this list, a "symbol vector" is constructed (as by the linker) of the value of each of the identified symbols, and the symbol vector is associated with the sharable image. A symbol table is also associated with the sharable image, where each symbol has the value of its index in the symbol vector. When resolving references to other images, the linker does a symbolic lookup in the symbol table of the target image and obtains the index into the target symbol vector. That index is bound into the calling image. Then, at program activation, the image activator uses the index bound into a calling image to obtain the current value of the symbol in the target image.

Because of the design of the advanced RISC instruction set, and in some cases because of the design of the calling standard, the current value of a symbolic reference obtained at program activation time is used with no additional overhead, in comparison to a symbolic value known at compile or link time.

An important feature is that no aspect of the symbol vector needs to be specified in compiled code; hence, the need for language extensions is avoided. Only the linker need support declaration of symbols for the symbol vector.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is a diagram of several code images for execution on a computer, illustrating features of the invention;

FIG. 2 is a diagram of a computer upon which the method of linking images according to the invention may be executed;

FIG. 3 is a diagram of a transfer vector used in VAX/VMS for linking images at startup;

DETAILED DESCRIPTION OF SPECIFIC EMBODIMENT

Figure 4:
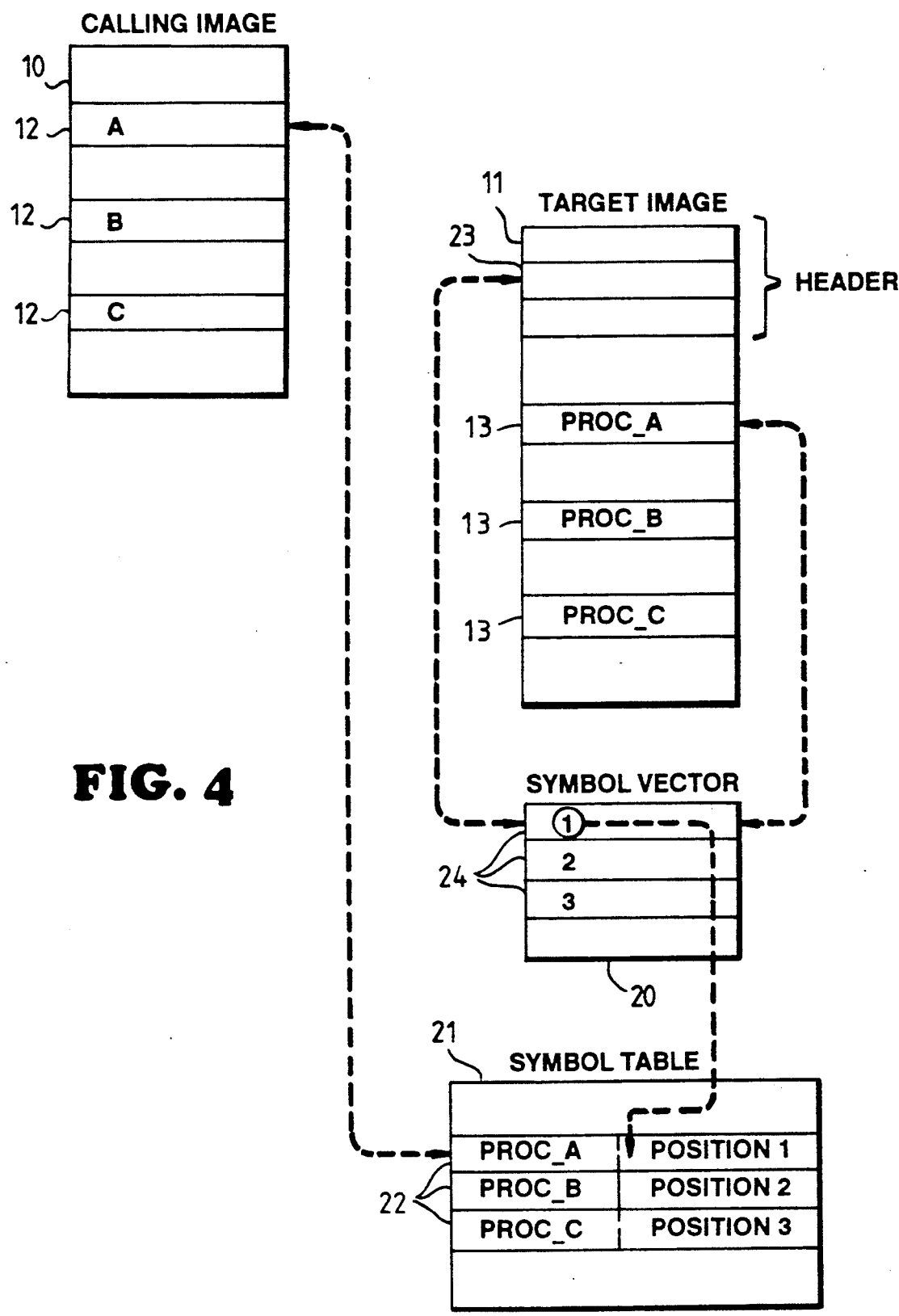
FIG. 4 is a diagram of code images and associated symbol table and symbol vector according to one embodiment of the invention.

Referring to FIG. 1, one part of a computer program is a code image 10 (a block of code), referred to as the calling image. Another part of the program is a code image 11, referred to as the target image. The calling image 10 contains procedure calls 12, instructions which call certain procedures 13 in target image 11, referred to as Proc__A, Proc__B and Proc__C. In source or assembly format, the program segments represented by these code images identify the called procedures 13 in symbolic form, i.e., by name (e.g., Proc__A, Proc__B, etc.), but when the code image is activated in memory to be executed by a CPU the procedures 13 must then be identified by an address (or linkage pair as will be referred to). Of course, the addresses are not known until activation time, that is, when the code of images 10 and 11 is invoked by a CPU 14 as in FIG. 2 and loaded to memory 15. In a virtual memory environment such as VMS virtual addresses are assigned at activation, and remain fixed, even though the physical addresses in memory 15 may change in a dynamic fashion in a multitasking environment as the code images are swapped in and out of memory to disk 16. If all of the calling and target images 10, 11, etc., that are to be executed referencing one another, are linked into a single package, (i.e., not using sharable images) the problem is alleviated, but that is not the case here. Instead, the target image is to be sharable, i.e., another calling image 17 may make calls 18 to the same target image 11. That is, in most conventional operating systems, sharable images are not supported, so if the two calling images 10 and 17 are in separately-activated programs and both make references to the same target image 11, then the section of code represented by the image 11 is merely duplicated. To support sharable images as illustrated in FIG. 1, a mechanism must be provided to accomplish the linkage function.

Referring to FIG. 3, the VAX/VMS operating system employed a transfer vector to support sharable images. The VAX architecture is described by Levy and Eckhouse in "Computer Programming and Architecture: The VAX", 2nd Ed., Digital Press, 1989, which is incorporated herein by reference. The VMS operating system included definition of a transfer vector 19 in the target image 11, and this transfer vector contained an entry A', B', C' for each of the procedures 13. Each entry contained the offset (a pointer referenced to the beginning of the transfer vector 19) to one of the procedures 13, and the entries were in a fixed order. The calling image 10 need only have the address of the transfer vector 19 and the order number of the called procedure within the transfer vector. The actual location of the procedures Proc_A, Proc_B, etc., in the image 11 of FIG. 4 could vary, so when updates or corrections to the code were made the references in the calling images to the transfer vector would still be valid, since the reference bound into the calling image would be the address of an entry in the transfer vector 19. As discussed above, however, this method has certain shortcomings in the present environment. Execution overhead is imposed upon each call to the shared image 11 because of having to pass control through the transfer vector 19 and then to the actual target routine 13; this overhead consists of executing added instructions and making additional memory references. Added programming effort is needed to specify and maintain the transfer vector 19. Execution errors can occur if the vector 19 is inadvertently changed. There is a lack of flexibility in referencing data cells and structures (as distinguished from executable procedures 13), since the data must be located within the appropriate entry in the transfer vector 19 itself, restricting the size of the data to the size of the entry, which is fixed since these must be in a certain position from the beginning of the transfer vector. Special language semantics may be required for the specification of transfer vector 19 which may not be available in the programming language being used.

According to the invention, a symbol vector 20 as illustrated in FIG. 4 is used instead of the transfer vector 19 of FIG. 3. As before, a target image 11 contains certain procedures 13 to be used by external references (e.g., from caller image 10); these procedures 13, again referred to as Proc_A, Proc_B and Proc_C, are located at arbitrary positions in the code of this image 11. Upon linking, the procedures 13 (identified by their symbol names) are identified and added to the symbol table 21, in order, thus creating symbol table entries 22. The symbol table 21 is of course a data structure ordinarily created by a compiler along with the code images, and is used by the linker to locate all external references to variables, literal values, procedures, callable routines, etc. Each entry in a symbol table contains the symbol name referenced to an index into a code image for the location of the corresponding item. Any item declared by the programmer to be global or universal is included in the symbol table, so the procedures 13 are thus declared. In addition, the linker builds a symbol vector 20 and places it in the image 11 at a default location or at some location defined in an options file, i.e., a pointer to this symbol vector 20 is given in a header 23. The vector 20 is built in the order that the symbols 13 appear in the link options file, and contains an entry 24 for each symbol 13. This order must remain the same over later builds. Entries 24 can be added to the end, and other entries can be obsoleted (in which event they hold a null entry), but ongoing entries 24 must be in the same original position. When resolving references to other images, the linker does a symbolic lookup in the symbol table 21 of the target image, finding an entry 22, and obtains the index into the symbol vector 20 for this target image 11; that index (ordinal number) for that image name 11 is bound into the calling image 10 at the calling position 12. At program activation, the image activator routine uses the index bound into the calling image 10 to obtain the current value of the symbol in the target image 11, by referencing the header 23 to get the pointer to the symbol vector 20 and indexing into the symbol vector to the entry 24 which contains the actual offset into the image 11 where the procedure 13 is to be found. The symbol vector 20 does not become part of the activated code in memory, nor of course does the symbol table 21. The reference at calling location 12 is to an address (or, in some cases, it is a literal value, if the symbol is a literal), rather than indirectly as in FIG. 3.

Figure 5:
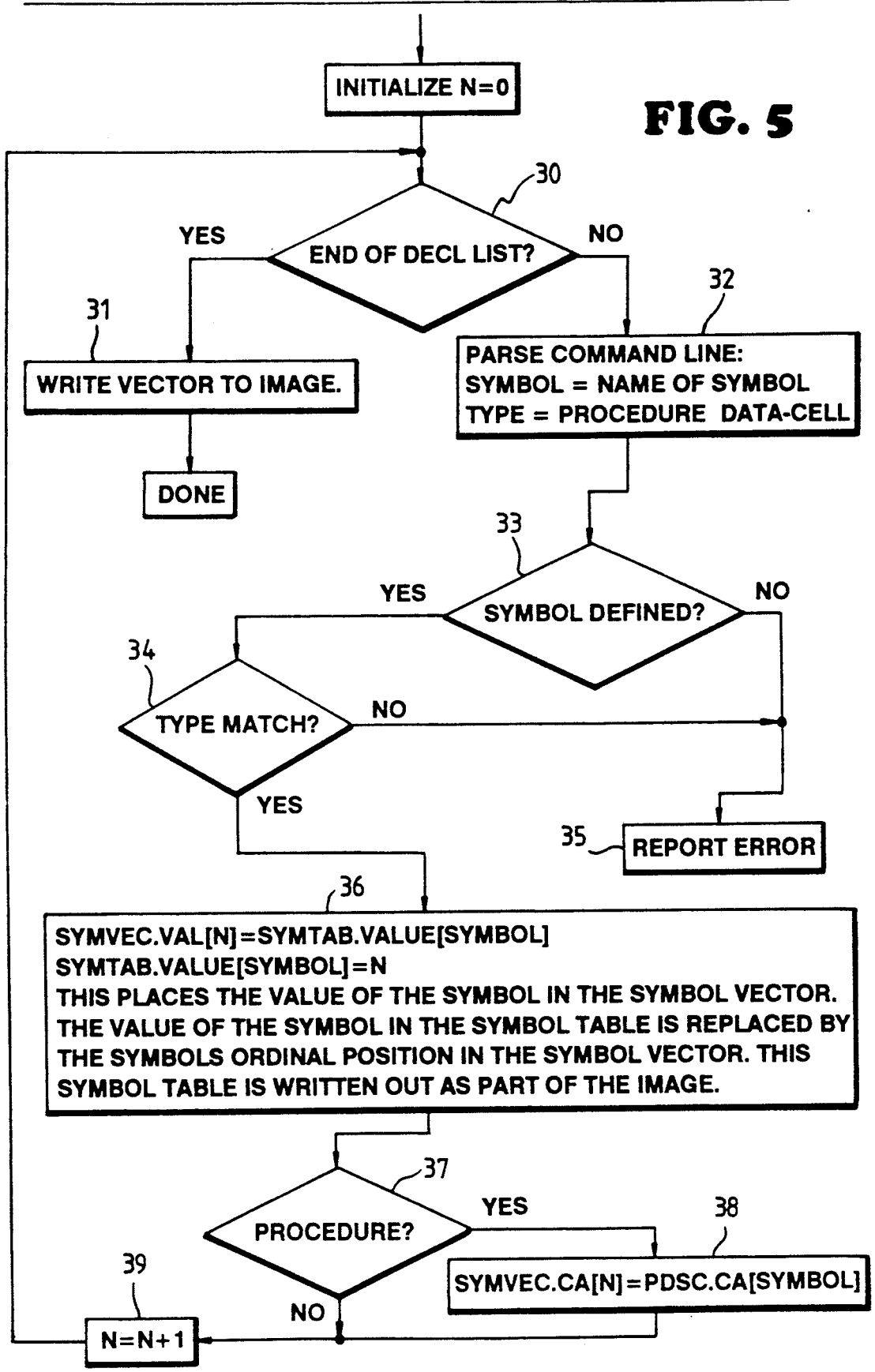
FIG. 5 is a flow chart of the steps added to the options file processing of a linker used in accordance with one embodiment of the invention.
Figure 6:
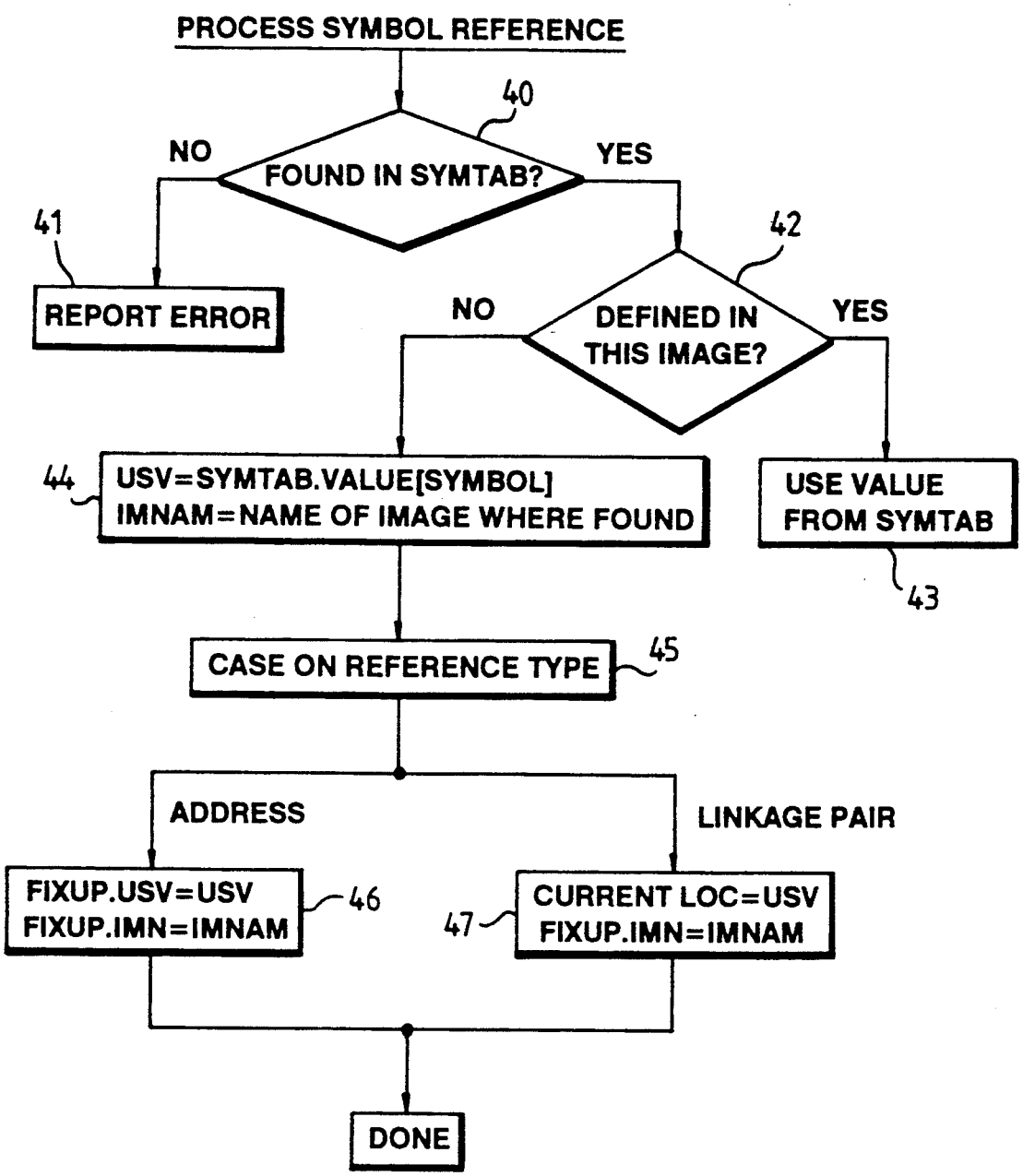
FIG. 6 is a flow chart of the steps added to a linker used for processing a symbol reference in accordance with the embodiment of the invention of FIG. 4.
Figure 7:
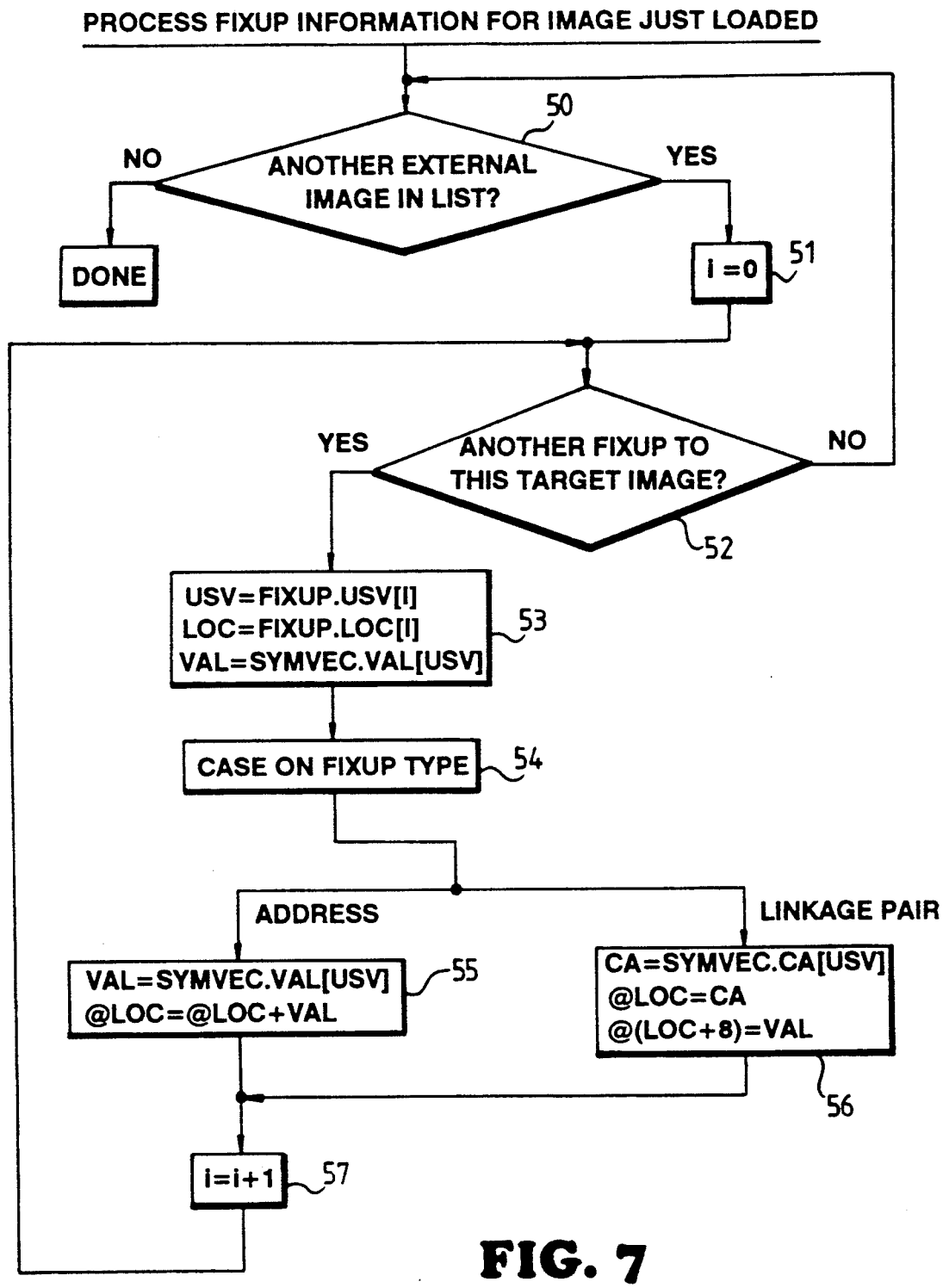
FIG. 7 is a flow chart of the steps used in an image activator for fixing up inter-image references in accordance with the embodiment of the invention of FIG. 4.

Referring to FIGS. 5-7, logic flow charts are shown for the operations associated with using the symbol vector features. In FIG. 5, a way of processing the symbol vector declarations in the link options file is illustrated. The programmer adds the names of the procedures 13 to the link options file, i.e., adds the names of items in a module that are to be externally visible or callable, and sets a SYMBOL_VECTOR option as true. The steps of FIG. 5 are an addition to the ordinary options file processing routines executed by the linker; the steps of FIG. 5 are invoked by the linker only if the SYMBOL_VECTOR option is seen. First, the variable N is initialized to zero, then a loop is entered using the decision point 30 to see if the end of the declaration list has been reached. If so, the symbol vector 20 is written to the image 11, indicated by item 31, and the operations of FIG. 5 are done. If not, the command line is parsed to get the next entry N (the next symbol 13 as identified by the user), and it is defined as the local variable SYMBOL, while its type (procedure or data cell) is defined as the variable TYPE, in the item 32 of the flow chart. The entries are checked in items 33 and 34 to see if properly defined, and if not an error is reported at item 35 and the routine exited. If the check is positive, at item 36 the value of the symbol is placed in the symbol vector 20 as an entry 24 at position N, and the value of the symbol in corresponding entry 22 in the symbol table 21 is replaced by the symbol's ordinal position N in the symbol vector 20. This symbol table 21 is written out as part of the image 11. Next, the entry is checked at item 37 to see if it is a procedure (instead of a data cell) and if so the indicated operation is performed at item 38, showing the code address field CA of the symbol vector being set up with the code address from the procedure descriptor PDSC, for this symbol. The code address entry is used upon activation, FIG. 7. Return is via item 39 to increment the ordinal number N. This loop is repeated until all of the entries 13 on the list have been processed, at which time the completed symbol vector 20 is written at item 31.

In FIG. 6, the steps added to the code of the linker for processing a symbol reference are shown. First, the linker fetches a symbol to process, and checks in item 40 to see if the symbol is an entry 22 by this name in the symbol table 21; if not, an error is reported at item 41. If the symbol is in the symbol table, the linker checks in item 42 to see if it is defined in this same image 11 it is processing, and if so it uses the value from the symbol table itself, shown as item 43. If not, the symbol table value in entry 22 (the ordinal number, from item 36) is used as the USV (universal symbol value), and the image name is defined as the name of the image 11 where the symbol is found, these operations being in item 44. Next is a case on reference type (item 45) so if it is an address type then the symbol value USV is defined as the fix-up USV and the image name is defined for the fix-up routine (item 46). If it is a linkage pair, the USV is substituted as the current location, and the image name provided, in item 47. The code images are now ready for activation. For each image to be fixed up (each IMNAM) there is a list of symbol values.

Referring to FIG. 7, the code used in the image activator for fixing up inter-image references is shown in flow chart form. The images are loaded, and the fixup begins to process the external images in the list, using a loop with a checkpoint 50 to see if each list is completed. Each entry has loop variable I set to zero at item 51 and enters a loop to check if all the fixups are done for this target image, using checkpoint 52. The operation here is to go down the list generated by the linker (see FIG. 6) that indicates all of the fixups that need to be made in this particular image; the same operation will be done for all of the other images that need fixups. For each fixup needed, two values are set in the operation of item 53 of the flow chart, one being the USV-universal symbol value-and the other being the LOC-location. The USV for this number i (FIXUP.USV(i), from item 46 or 47) is set as USV, so that gives an index into the symbol vector 22 for the entry 24 needed; the VAL=SYMVAC.VAL[USV] means pulling a value out of the symbol vector 20 for the target image 11, indexed by USV-thus giving the value for the symbol. The location in the image 10 to be fixed up is the variable LOC, in item 53. Next, there is a case on fixup type, item 54, and if it is an address then in item 55 the location is set to the sum of the present location plus VAL. The value VAL is what is intended to be the actual final value of the symbol in the image where it was defined, i.e., that is what the user really wants to have in hand when he references that symbol-instead of a name (Proc_A, etc.) typically an address (although it could be just a constant). So, the @LOC=@LOC+VAL operation in item 55 means that at the location LOC which was picked up in item 53 (for this image) the value VAL is added to obtain the desired location.

If it is a linkage pair then the indicated operations are implemented. A linkage pair is two separate quadwords that are addresses related to a particular procedure, one quadword is a procedure descriptor and the other is the actual address of the first instruction of the code of the procedure. This is a specification for doing procedure calls on the advanced RISC architecture referred to. In the item 56 of FIG. 7, one quadword is fixed up using the VAL, by @(LOC+8)=−VAL. The other is fixed up with a code address CA which is picked up from the symbol vector entry 24 (using ordinal number USV as index, again, to select that entry). This CA is becomes the @LOC. This loop continues with i incremented at item 57 until all of the fixups are completed.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of preparing a calling image for execution on a computer comprising the steps of:

providing an ordered list of identified symbols contained in a target image which are available for referencing by said calling image;

constructing from said ordered list a symbol vector associated with said target image, said symbol vector containing a vector entry identified by a vector index for each of said identified symbols, and each vector entry containing corresponding target image information for said identified symbol;

binding in said calling image the vector index corresponding to each identified symbol which is referenced in said calling image; and upon activating said target image and said calling image for execution, utilizing said vector index bound into said calling image to obtain from said symbol vector said corresponding target image information for each of said identified symbols.

2. A method according to claim 1 wherein upon activating said target image and said calling image for execution upon said computer, said symbol vector is excluded from said target image which is activated.

3. A method according to claim 1 wherein said target image is a sharable image.

4. A method according to claim 3 including a second calling image, and binding in said second calling image a vector index corresponding to each identified symbol referenced by said second calling image.

5. A method according to claim 1 wherein at least one of said vector entries is an absolute value and the corresponding identified symbol is a globally defined constant.

6. A method according to claim 1 further comprising providing a symbol table of said identified symbols and corresponding vector indices representing a position in the symbol vector of each said identified symbol's target image information.

7. A method according to claim 6 wherein said binding uses the symbol table to obtain for each identified symbol a corresponding vector index.

8. A method according to claim 1 wherein at least one of said vector entries is a target image offset and the corresponding identified symbol is a procedure call.

9. A method according to claim 1 wherein at least one of said vector entries is a target image offset and the corresponding identified symbol is for a data area.

10. Apparatus for preparing a calling image for execution on a computer, comprising:

means for recording an ordered list of identified symbols in a target image which are available for referencing by said calling image;

means for constructing from said ordered list a symbol vector associated with said target image, said symbol vector containing a vector entry identified by a vector index for each of said identified symbols, and each vector entry containing corresponding target information for said identified symbol;

means for binding in said calling image a vector index corresponding to each identified symbol which is referenced in said calling image; and means, effective upon activating said target image and said calling image, for obtaining from said symbol vector said corresponding target information for each of said identified symbols by utilizing said vector index bound into said calling image.

11. Apparatus according to claim 10 wherein said means for activating said target image and said calling image for execution upon said computer does not load said symbol vector into memory for execution.

12. Apparatus according to claim 10 wherein said target image is a sharable image.

13. Apparatus according to claim 12 including a second calling image, and means for binding in said second calling image a vector index corresponding to each identified symbol referenced by said second calling image.

14. Apparatus according to claim 10 including means for generating a symbol table containing said vector index for each of said identified symbols.

15. Apparatus according to claim 14 wherein said means for binding utilizes said symbol table to obtain said vector index.

16. Apparatus according to claim 10 wherein at least one of said vector entries is an absolute value and the corresponding identified symbol is a globally defined constant.

17. Apparatus according to claim 10 wherein at least one of said vector entries is a target image offset and the corresponding identified symbol is a procedure call.

18. Apparatus according to claim 10 wherein at least one of said vector entries is a target image offset and the corresponding identified symbol is for a data area.

* * * * *